(12) United States Patent
Chibon et al.

(10) Patent No.: US 12,335,344 B2
(45) Date of Patent: Jun. 17, 2025

(54) REMOTE SERVICE ORCHESTRATION AND MIRRORING FOR COMPUTING DEVICES

(71) Applicant: Red Hat, Inc., Raleigh, NC (US)

(72) Inventors: Pierre-Yves Chibon, Saint-Pol-de-Léon (FR); Leigh Griffin, Kilmacthomas (IE)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 18/319,173

(22) Filed: May 17, 2023

(65) Prior Publication Data

US 2024/0388634 A1  Nov. 21, 2024

(51) Int. Cl.
*H04L 67/141* (2022.01)

(52) U.S. Cl.
CPC ................... *H04L 67/141* (2013.01)

(58) Field of Classification Search
CPC ...................................... H04L 67/141
USPC ............................................. 709/227
See application file for complete search history.

(56) References Cited

U.S. PATENT DOCUMENTS

| 11,469,944 | B1* | 10/2022 | Lindholm | H04L 41/0897 |
| 2011/0107406 | A1* | 5/2011 | Frost | H04L 63/029 |
| | | | | 726/6 |
| 2018/0329733 | A1* | 11/2018 | Aronov | G06F 9/4843 |
| 2019/0281052 | A1* | 9/2019 | Lekkas | H04L 9/14 |
| 2022/0171648 | A1 | 6/2022 | Rodriguez et al. | |

FOREIGN PATENT DOCUMENTS

| CN | 112328361 A | 2/2021 |
| CN | 112416524 A | 2/2021 |
| CN | 115543383 A | 12/2022 |

OTHER PUBLICATIONS

Breard, "Manage containers at the edge with Linux," Red Hat, Inc., Posted: Sep. 16, 2018, 7 pages. https://www.redhat.com/sysadmin/linux-edge-container-management.

McCarty, "A Practical Introduction to Container Terminology," Red Hat, Inc., Feb. 22, 2018, 29 pages. https://developers.redhat.com/blog/2018/02/22/container-terminology-practical-introduction#/pet_containers.

* cited by examiner

*Primary Examiner* — Ario Etienne
*Assistant Examiner* — Kidest Mendaye
(74) *Attorney, Agent, or Firm* — Womble Bond Dickinson (US) LLP

(57) ABSTRACT

The technology disclosed herein enables receiving a first remote access command identifying a second computing system, a service on the second computing system, and an action to be performed with respect to the service by a service manager of a first computing system, and transmitting a first action command derived from the first remote access command to a service manager of the second computing system by the service manager of the first computing system. The service manager of the second computing system is enabled for remote access.

17 Claims, 6 Drawing Sheets

Receive, by a service manager of a first computing system, a first remote access command identifying a second computing system, a service on the second computing system, and an action to be performed with respect to the service.

310

Transmit, by the service manager of the first computing system, a first action command derived from the first remote access command to a service manager of the second computing system, wherein the service manager of the second computing system is enabled for remote access.

REMOTE SERVICE ORCHESTRATION AND MIRRORING FOR COMPUTING DEVICES

TECHNICAL FIELD

The present disclosure is generally related to a computing environment, and more particularly, to remote service orchestration and mirroring for computing devices within the computing environment.

BACKGROUND

Computing environment is a group of interconnected devices and systems that work together to share resources, exchange information, and provide services to users. Computing environments are used in various applications, such as an automotive system which provide communication and coordination between dozens of interconnected systems, such as infotainment, safety, and engine management. For example, sensor data from cameras, radar, and lidar can be processed by on-board computers and shared between different systems to enable advanced driver assistance features, such as automatic emergency braking and lane departure warning.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 3 illustrates remote service orchestration and mirroring for computing devices using a computing device of the computing environment, in accordance with one or more aspects of the present disclosure;

DETAILED DESCRIPTION

Figure 1:
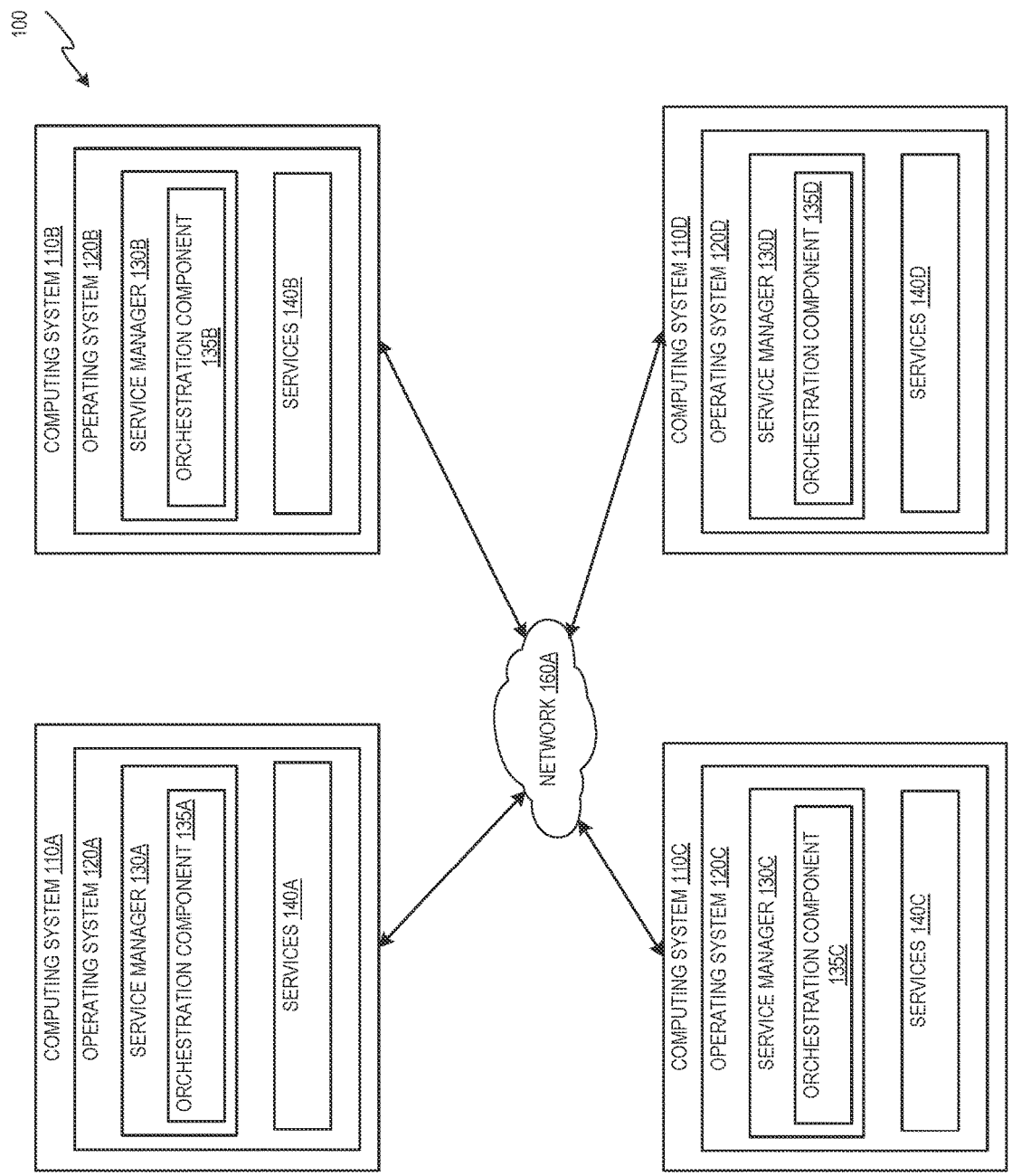
FIG. 1 depicts a high-level block diagram of an example computing environment, in accordance with one or more aspects of the present disclosure.

Described herein are methods and systems for remote service orchestration and mirroring for computing devices of a computing environment. Computing environments are a group of interconnected computing devices and systems (herein referred to as "computing systems") that work together to share resources, exchange information, and provide services to users. Service orchestration may be used to coordinate and automate various services and applications within one or more computing systems of the computing environment.

Service orchestration involves the use of various external tools, such as configuration management tools. Typically, these configuration management tools use various protocols, such as secure shell (SSH), to securely access and control remote services. In particular, each of the configuration management tools may be used to manage the configurations on the remote note by configuring the remote computing system to allow SSH connections from the configuration management tools (e.g., installing an agent on the remote computing system or installing SSH packages on the remote computing system). Once the remote computing system is configured for SSH connections, the configuration management tools may connect to the remote computing system, with a specified desired configuration state of the remote computing system, to execute the necessary commands or scripts to bring the computing system into the desired state. However, the configuration of the remote computing systems to allow SSH connection may require additional disk space and processing power, which can be a significant burden on remote computing systems with limited resources, thereby increasing the footprint on the remote computing system. This may not be practical or even possible in some remote computing systems due to their limited resources or specialized configurations. In some instances, the increased footprint may cause potential risk vectors that impact the safety of the computing environment.

Aspects of the present disclosure address the above-noted and other deficiencies by allowing remote access between service managers of computing systems within a computing environment. For example, the service manager of each computing system within the computing environment is enabled to listen for commands from other computing systems within the computing environment. In some embodiments, a computing system (e.g., a main computing system) may be used to remote control another computing system (e.g., a worker computing system). The main computing system can issue an action command directed to the worker computing system. The service manager of the worker computing system may listen for the action command and execute the action command in the worker computing system. In other embodiments, two computing systems may be configured to mirror one another. Thus, any action commands a computing system (e.g., a primary computing system) receives may be forwarded to another computing system (e.g., a secondary computing system). The primary computing system issues an action command that is directed to the secondary computing system based on the received action command. The service manager of the secondary computing system may listen for the action command and execute the action command in the secondary computing system so that the secondary computing system matches the primary computing system.

Advantages of the present disclosure include, but are not limited to, providing the operating system of computing systems the ability to control remote services, thereby reducing the footprint in the computing systems.

FIG. 1 depicts an illustrative architecture of elements of a computing environment 100, in accordance with an embodiment of the present disclosure. It should be noted that other architectures for computing environment 100 are possible, and that the implementation of a computing system utilizing embodiments of the disclosure is not necessarily limited to the specific architecture depicted. Computing environment 100 may include one or more interconnected computing systems (e.g., computing systems 110A-110D) via network 160. Network 160 may be a public network (e.g., the Internet), a private network (e.g., a local area network (LAN), a wide area network (WAN)), or a combination thereof. In one example, network 160 may include a wired or a wireless infrastructure, which may be provided by one or more wireless communications systems, such as a wireless fidelity (WiFi) hotspot connected with the network 160 and/or a wireless carrier system that can be implemented using various data processing equipment, communication towers, etc.

Each computing system of the computing environment 100 may be a computing device and system. Each computing system (e.g., computing systems 110A) includes instances of an operating system (e.g., 120A). Operating system 120A may include a service manager 130A. Service manager 130A may provide a standard process for controlling the management of services and process supervision. Service manager 130A may use a set of configuration files, called unit files, to define how services, sockets, targets, and other system components should be managed. Each service may be one or more background processes or daemons that perform specific tasks and provide various system-level functionalities to other applications and users. Services may include network services, system management services, security services, and/or application services. Each unit file defines services stored in various directories of the operating system, which specify various configuration options for a service it defines, such as the executable path, command-line arguments, working directory, dependencies, and other related settings. Service manager 130A may be controlled via a command-line interface tool to allow management and control of the services (e.g., starting, stopping, enabling, and/or disabling services) and/or view service information (e.g., the status of a service, check active services, and/or service logs).

Service manager 130A may further include an orchestration component 135A. Orchestration component 135A may be a service (or daemon process) that continuously runs in the background and listens for communications coming from other computing systems (e.g., computing systems 110B-D). Depending on the embodiment, communication between computing systems of the computing environment 100 may be encrypted and/or cryptographically signed using known techniques, such as private/public key mechanisms for encryption or shared secret for signature validation. The orchestration component 135A, responsive to receiving communication from other computing systems, may allow the other computing systems to directly manage and control services 140A (e.g., starting, stopping, enabling, and/or disabling services 140A) and/or view services 140A information (e.g., the status of a service of service 140A, check active services of service 140A, and/or service logs).

Each computing system 110B-D may be similar to computing system 110A, for example, operating system 120A of computing system 110A is similar to 120B-D of computing systems 110B-D, respectively, service manager 130A of computing system 110A is similar to 130B-D of computing systems 110B-D, respectively, and orchestration component 135A of computing system 110A is similar to orchestration component 135B-D of computing systems 110B-D, respectively. One or more services of services 140A of computing system 110A may be different or similar to one or more services of services 140B-D of computing system 110B-D, respectively.

In some embodiments, a computing system of the computing environment 100 may be designated as a main computing system (e.g., computing system 110A), while the remaining computing systems may be designated as worker computing systems (e.g., computing systems 110B-D). Computing systems 110A-D may be enabled for remote access. For example, the service manager of each computing system in the computing environment 100 (e.g., computing system 110A-D) may start the orchestration component within the respective computing system via a command-line interface tool. Once the orchestration component in each computing system is started, the orchestration component (e.g., orchestration component 135A) of the main computing system (e.g., computing system 110A) may listen for a remote access command to manage services, control services, and/or view service information of a worker computing system (e.g., computing system 110B-D). The remote access command may specify a service on a worker computing system (e.g., computing system 110B), an action to be performed (e.g., start) with respect to the specified service on the worker computing system, and an address of the worker computing system (e.g., an internet protocol (IP) address of the worker computing system). The orchestration component of the main computing system (e.g., orchestration component 135A) may send an action command derived from the remote access command to the worker computing system (e.g., computing system 110B) indicated in the remote access command. Depending on the embodiment, the main computing system may query the other computing systems to determine whether the other computing systems are enabled for remote access. For example, the main computing system may send a test command to other computing systems and listen for a response to the test command. If a response is received, the other computing systems are enabled, otherwise, the other computing systems are not enabled. The action command may specify the action to be performed (e.g., start) and the service for the action to be performed on (e.g., start service). The orchestration component (e.g., orchestration component 135B) of the worker computing system (e.g., computing system 110B) may listen for the action command and execute the action command (e.g., start service) on the worker computing system (e.g., computing system 110B). In some embodiments, the orchestration component (e.g., orchestration component 135B) of the worker computing system (e.g., computing system 110B) may cause the service manager (e.g., the service manager 130B) of the worker computing system (e.g., computing system 110B) to execute the action command on the worker computing system (e.g., computing system 110B).

Depending on the embodiment, the orchestration component (e.g., orchestration component 135A) of the main computing system (e.g., computing system 110A) may listen for a computing system naming command to assign a worker computing system (e.g., computing system 110C) a unique identifier that can be used instead of the address of the worker computing system (e.g., IP address). In some embodiments, the computing system naming command may be sent to the orchestration component of the main computing system by a user. The user may specify the unique identifier to be assigned to the worker computing system. In some embodiments, the computing system naming command may be automatically sent to the orchestration component of the main computing system each time a worker computing system (e.g., one of computing system 110B-D) is added to the computing environment 100. The unique identifier to be assigned may be auto generated. As a result of the computing system naming command, the orchestration component of the main computing system may store, for each worker computing system of the computing environment 100 included in the computing system naming command, a record. Each record provides a mapping from a unique identifier to an address of a respective worker computing system. Thus, the remote access command may specify a unique identifier associated with a worker computing system rather than the address of the worker computing system.

Depending on the embodiment, the remote access command may specify multiple worker computing systems. For example, multiple worker computing systems may be specified by a list of IP addresses, a list of unique identifiers, a list of IP addresses and unique identifiers, or a group identifier referencing a list of multiple worker computing systems. The group identifier may be an identifier assigned to a list of IP addresses, unique identifiers, or a combination of IP addresses and unique identifiers for the multiple worker computing systems. The computing systems of the multiple worker computing systems specified in the remote access command listen for an action command derived from the remote access command. However, the computing systems of the multiple worker computing systems specified in the remote access command that can execute the action command execute the action command. In particular, any worker computing system of the multiple worker computing systems that can execute the action command is executed by the worker computing systems. Otherwise, any worker computing system unable to execute the action command ignores the action command.

Depending on the embodiment, the remote access command may specify more than one service. For example, multiple services may be specified by a list of services or a group service identifier referencing the multiple services. The group service identifier may be an identifier assigned to a list of multiple services. Accordingly, multiple action commands may be derived from the group service identifier. In particular, an action command for each service of the multiple services (or each service included in the group service identifier) is generated by coupling the action to be performed specified in the remote access command with each service of the multiple services (or each service included in the group service identifier). The computing systems of the multiple worker computing systems specified in the remote access command listen for an action command derived from the remote access command. However, the orchestration component of the worker computing system or each worker computing system of the multiple worker computing systems specified in the remote access command that can execute a respective action command of the multiple action commands executes the respective action command. Otherwise, the respective action command of the multiple action commands is ignored by the worker computing system or each worker computing system of the multiple worker computing systems.

Depending on the embodiment, responsive to performing an action command on the main computing system (e.g., an action with respect to a service on the main computing system), the orchestration component of the main computing system generates a remote access command identifying the worker computing system or each worker computing system of the multiple worker systems, a service on the worker computing system or each worker computing system of the multiple worker systems that match the service on the main computing system, and an action to be performed with respect to the service on the worker computing system or each worker computing system of the multiple worker systems that match the action performed on the service on the main computing system. The remote access command is transmitted, by the orchestration component of the main computing system, to the worker computing system or each worker computing system of the multiple worker systems.

Figure 2:
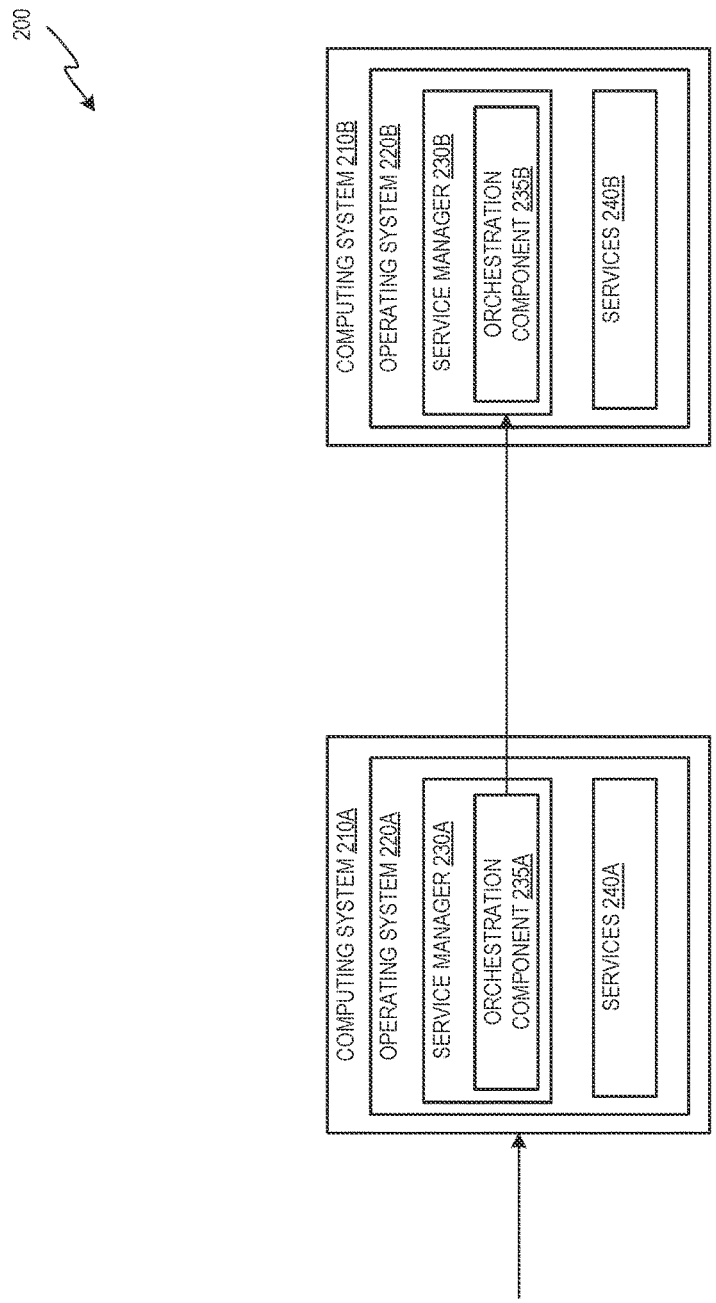
FIG. 2 depicts a flow diagram of an example method for remote service orchestration and mirroring for computing devices of the computing environment, in accordance with one or more aspects of the present disclosure.

FIG. 2 depicts an illustrative example of remote service mirroring for computing devices of the computing environment. Computing systems 110A-D of FIG. 1 may be the same or similar to the primary computing system 210A and a secondary computing system 210B. The orchestration component may directly manage and control the services (e.g., services 240B) of other computing systems (e.g., secondary computing systems) to mirror the changes of a primary computing system. The primary computing system 210A and/or the secondary computing system 210B may be enabled for remote access, similar to computing systems 110A-D of FIG. 1. The primary computing system 210A may be enabled for mirroring via a command-line interface tool of the primary computing system 210A. For example, the orchestration component of the primary computing system 210A (e.g., orchestration component 235A) may listen for a mirroring command specifying one or more secondary computing systems (e.g., secondary computing system 210B) that should mirror a primary computing system. Responsive to receiving the mirroring command, the orchestration component 235A enables the forwarding of action commands to be executed on the primary computing system 210A to the secondary computing system 210B. For example, the orchestration component 235A may listen for an action command and execute the action command on the primary computing system 210. The orchestration component 235A may forward the received action command to the secondary computing system 210B to be executed. The orchestration component of the secondary computing system 210B (e.g., orchestration component 235B) listens for an action command and executes the forwarded action command from the primary computing system 210A on the secondary computing system 210B. Similar to computing systems 110A-D of FIG. 1, the orchestration component 235B may execute the forwarded action command or cause the service manager 230B of the secondary computing system 210B may execute the forwarded action command.

Depending on the embodiment, the secondary computing system 210B, just like the primary computing system 210A, may be enabled for mirroring via a command-line interface tool of the second computing system 210B. For example, the orchestration component 235B of secondary computing system 210B may listen for a mirroring command specifying that the secondary computing system 210B should mirror the primary computing system 210A. The orchestration component 235B may transmit a command to the primary computing system 210A to request the one or more action commands necessary to mirror the secondary computing system 210B to the primary computing system 210A. The command may be sent periodically or in response to the secondary computing system 210B going offline. The orchestration component 235A may listen for the command and transmit, to the secondary computing system 210B, the one or more action commands that would cause the secondary computing system 210B to mirror the primary computing system 210A. Depending on the embodiment, the command may indicate a timestamp of the last service from a log to be executed on the secondary computing system 210B. Thus, the primary computing system 210A, based on a log and the command from the secondary computing system 210B, may determine one or more action commands that would cause the secondary computing system 210B to mirror the primary computing system 210A. Each computing system may maintain a log of services executed with corresponding timestamps. Accordingly, in some embodiments, the command may include a log of services executed by the secondary computing system 210B, which can be compared to the log of services executed by the primary computing system 210A.

FIG. 3 depicts a flow diagram of an illustrative example of a method 300 for remote service orchestration and mirroring for computing devices of the computing environment, in accordance with one or more aspects of the present disclosure. Method 300 and each of its individual functions, routines, subroutines, or operations may be performed by one or more processors of the computer device executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processes implementing method 300 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by a service manager as shown in FIG. 1 or by an executable code of a computing system (e.g., operating system).

Method 300 may be performed by a processing device of a computing system and may begin at block 310. At block 310, the processing device receives, by a service manager of a first computing system, a first remote access command identifying a second computing system, a service on the second computing system, and an action to be performed with respect to the service. In some embodiments, the second computing system may be identified by one of: an internet protocol (IP) address, a unique identifier, or a group identifier. As previously described, the unique identifier is generated by a command (e.g., a computing system naming command) executed by the service manager of the first computing system which allows the first computing system to use the unique identifier instead of the IP address associated with the second computing system. The group identifier is an identifier assigned to a list of IP addresses, unique identifiers, or a combination of IP addresses and unique identifiers for multiple worker computing systems.

At block 320, the processing device transmits, by the service manager of the first computing system, a first action command derived from the first remote access command to a service manager of the second computing system. The service manager of the second computing system may be enabled for remote access. As previously described, the second computing system may be enabled for remote access by starting an orchestration component within the service manager via a command-line interface tool. Thus, remote access to the service manager of the second computing system may be further performed via the command-line interface tool. In some embodiments, the service manager the first computing system and the second computing system may include a daemon process. As previously described, the service manager may include the daemon process (e.g., the orchestration component) that continuously runs in the background and listens for communications coming from other computing systems.

In some embodiments, the processing device may determine whether remote access of the service manager of the second computing system is enabled prior to transmission of the first action command. As previously described, the first computing system may send a test command to the second computing system and listen for a response to the test command from the second computing system. Response to receiving the response to the test command from the second computing system, the first computing system determines that the second computing system is enabled for remote access. In some embodiments, the first action command transmitted, by the service manager of the first computing system, to the service manager of the second computing system may be executed by the service manager of the second computing system.

In some embodiments, transmission between the service manager of the first computing system and the service manager of the second computing system may be encrypted and/or cryptographically signed using known techniques, such as private/public key mechanisms for encryption or shared secret for signature validation.

Depending on the embodiment, responsive to performing an action with respect to a service on the first computing system, the processing device generates a second remote access command identifying the second computing system, a service on the second computing system, and an action to be performed with respect to the service on the second computing system. The service on the second computing system may match the service on the first computing system. The action performed with respect to the service on the first computing system may match the action to be performed with respect to the service on the second computing system. The processing device may transmit, by the service manager of the first computing system, a second action command derived from the second remote access command to a service manager of the second computing system.

Figure 4:
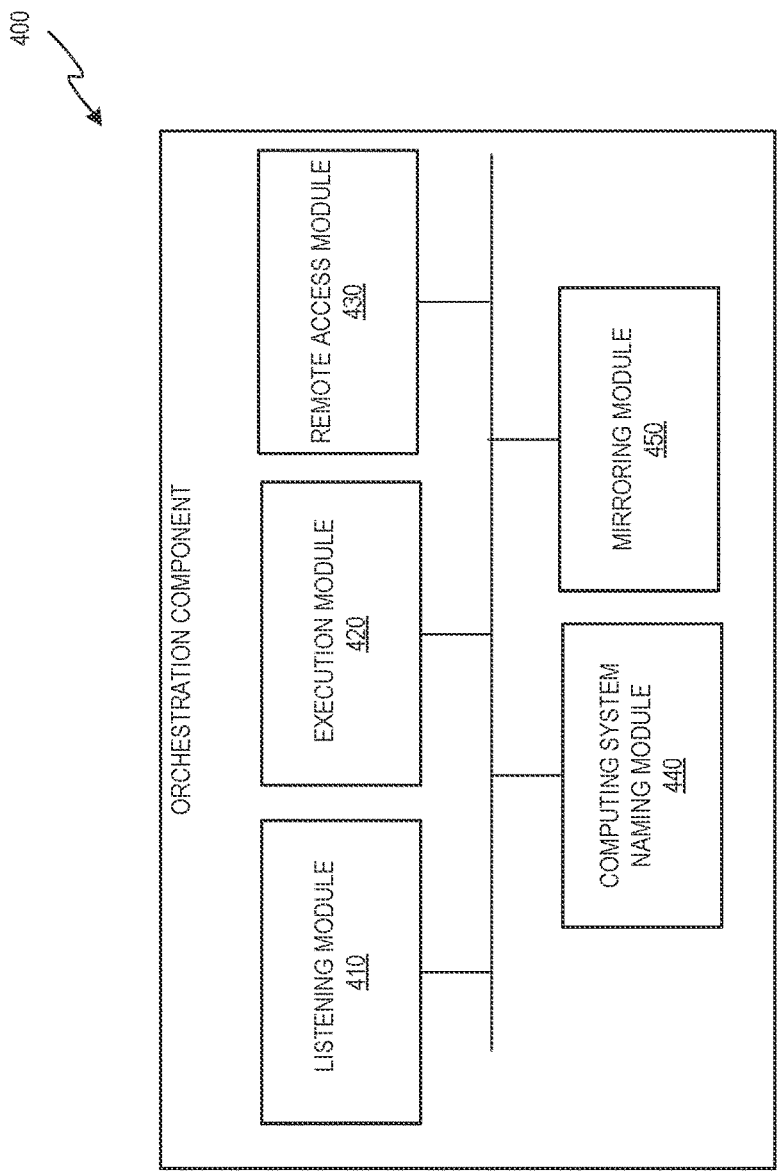
FIG. 4 depicts a block diagram of a computer system operating in accordance with one or more aspects of the present disclosure.

FIG. 4 depicts a block diagram of an orchestration component 400 within a service manager of a computing system operating in accordance with one or more aspects of the present disclosure. Orchestration component 400 may be the same or similar to the orchestration component 135A-D of FIG. 1 and the orchestration components 235A and B and may be implemented using one or more processing devices and one or more memory devices. In the example shown, orchestration component 400 may include a listening module 410, an execution module 420, a remote access module 430, a computing system naming module 440, and a mirroring module 450.

Orchestration component 400 may be enabled to allow for remote access of the computing system. The service manager of the computing system in which the orchestration component 400 resides starts the orchestration component 400 via a command-line interface tool.

Once the orchestration component 400 is started, the listening module 410 continuously listens for communication from other computing systems. For example, the listening module 410 may receive a remote access command, an action command, a computing system naming command, a mirroring command, or etc. Depending on the command, the listening module 410 may forward the command to the appropriate module to process the command. If the listening module 410 receives an action command, the listening module 410 forwards the action command to the execution module 420 to be processed. If the listening module 410 receives a remote access command, the listening module 410 forwards the remote access command to the remote access module 430 to be processed. If the listening module 410 receives a computing system naming command, the listening module 410 forwards the computing system naming command to the computing system naming module 440 to be processed. If the listening module 410 receives a mirroring command, the listening module 410 forwards the mirroring command to the mirroring module 450 to be processed.

The execution module 420 may receive the action command from the listening module 410. The action command may be a command that specifies the action to be performed and the one or more services for the action to be performed on (e.g., start service 1 or stop service 1, service 2, and service 3). Actions can include starting, stopping, enabling, disabling, status, active services, logs, etc. The execution module 420 may identify, based on the one or more services specified in the action command, the one or more services from services of the computing system. The execution module 420 may initiate the action specified in the action command on the one or more services from services of the computing system.

The remote access module 430 may receive the remote action command from the listening module 410. The remote action command may be a command that specifies an action command (e.g., each action to be performed and one or more services for the action to be performed on) and one or more designated computing systems for the action command. The one or more services may be designated by a name of the one or more services or a group service identifier. The group service identifier collectively references the one or more services. The one or more designated computing systems may be designated by addresses (e.g., IP addresses), unique identifiers, and/or a group identifier. The group identifier collectively references the one or more designated computing systems using IP addresses and/or unique identifiers. In response to receiving the remote action command, the remote access module 430 transmits the action command associated with the remote action command to each of the one or more designated computing systems to be executed.

The computing system naming module 440 may receive the computing system naming command from the listening module 410. In some embodiments, the computing system naming command may originate from a user or may be automatically sent in response to the addition of a computing system to the computing environment. The computing system naming command assigns a unique identifier to the computing system. In some embodiments, the unique identifier may be specified by a user or the sender of the computing system naming command. In some embodiments, the unique identifier may be auto generated.

The mirroring module 450 may receive a mirroring command from the listening module 410. The mirroring command may be a command that specifies computing systems that should be mirrored. In particular, one or more computing systems (e.g., secondary computing systems) to mirror a primary computing system. If the mirroring module 450 is the mirroring module of the primary computing system, the mirroring module 450 may generate a remote access command with any action command received by the listening module 410 and the one or more computing systems specified in the mirroring command, before or after execution of the action command by the execution module 420, to be transmitted to the remote access module 430.

If the mirroring module 450 is the mirroring module of one of the one or more secondary computing systems, the mirroring module 450 may generate a command to be sent to the primary computing system to request one or more action commands necessary to mirror the secondary computing system to the primary computing system. The command may indicate, from a log, a timestamp of the last service to be executed on the secondary computing system, which can be compared to the logs of the primary computing system to determine the one or more action commands necessary to mirror the secondary computing system to the primary computing system. The command may be sent periodically or in response to the secondary computing system going offline. The listening module 410 of the primary computing system may forward the received command requesting one or more action commands to the mirroring module 450 of the primary computing system. The mirroring module 450 of the primary computing system determines the one or more action commands that would allow the secondary module to mirror the primary computing system and generates one or more remote access commands to provide the action commands and execute the action commands on the secondary computing systems. In particular, the one or more generated remote access commands are transmitted to the remote access module 430 which is then used to send the action commands to the secondary computing system.

Figure 5:
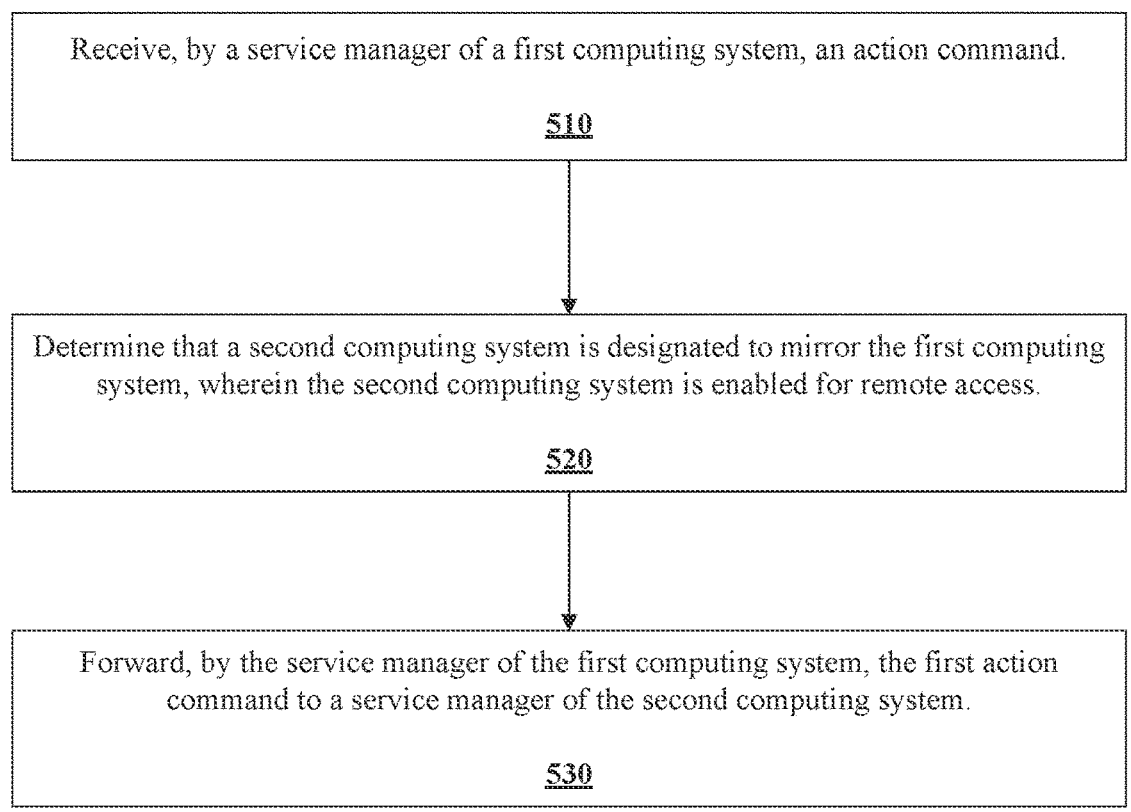
FIG. 5 depicts a flow diagram of an example method for remote service orchestration and mirroring for computing devices of the computing environment, in accordance with one or more aspects of the present disclosure.

FIG. 5 depicts a flow diagram of an illustrative example of a method 500 for remote service orchestration and mirroring for computing devices of the computing environment, in accordance with one or more aspects of the present disclosure. Method 500 and each of its individual functions, routines, subroutines, or operations may be performed by one or more processors of the computer device executing the method. In certain implementations, method 500 may be performed by a single processing thread. Alternatively, method 500 may be performed by two or more processing threads, each thread executing one or more individual functions, routines, subroutines, or operations of the method. In an illustrative example, the processing threads implementing method 500 may be synchronized (e.g., using semaphores, critical sections, and/or other thread synchronization mechanisms). Alternatively, the processes implementing method 500 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 500 may be performed by a service manager as shown in FIG. 1 or by an executable code of a computing system (e.g., operating system).

Method 500 may be performed by a processing device of a computing system and may begin at block 510. At block 510, the processing device receives, by a service manager of a first computing system, an action command.

At block 520, the processing device determines that a second computing system is designated to mirror the first computing system, wherein the second computing system is enabled for remote access.

At block 530, the processing device forwards, by the service manager of the first computing system, the action command to a service manager of the second computing system. Depending on the embodiment, the processing device forwards, before or after the execution of the action command on the first computing system, the action command to the service manager of the second computing system. As previously described, the first computing system and the second computing system may receive a mirror command. The mirroring command indicates that the second computing system should mirror the first computing system. Accordingly, action commands received by the first computing system is forwarded to the second computing system.

Depending on the embodiment, the processing device receives, by the service manager of the first computing system, a command requesting confirmation that the second computing system mirrors the first computing system. The command may be received from the service manager of the second computing system. Responsive to determining that the second computing system does not mirror the first computing system, the processing device transmits, by the service manager of the first computing system, one or more action commands to the service manager of the second computing system that will cause the second computing system to mirror the first computing system. In some embodiments, the command requesting confirmation that the second computing system mirrors the first computing system may include one of: a time stamp of the last service executed, or a log of services executed by the second computing system.

Figure 6:
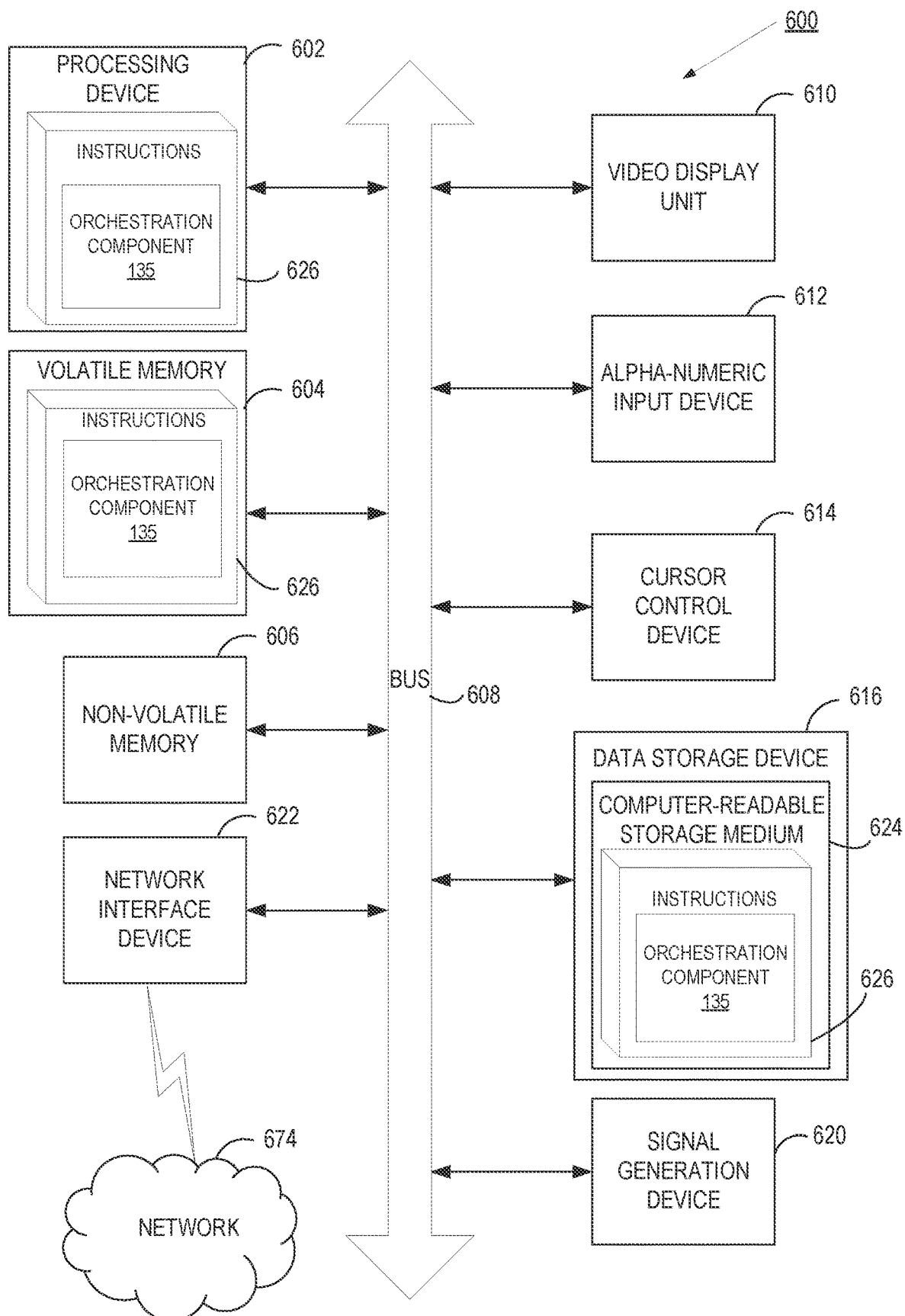
FIG. 6 depicts a block diagram of an example computer system operating in accordance with one or more aspects of the present disclosure.

FIG. 6 depicts a block diagram of a computer system operating in accordance with one or more aspects of the present disclosure. In various illustrative examples, computer system 600 may correspond to computing environment 100 of FIG. 1. Computer system 600 may be included within a data center that supports virtualization. Virtualization within a data center result in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical environment, but requests for a hard disk or memory may be managed by a virtualization layer of a computing device to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alpha-numeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing method 600.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "deriving," "encrypting," "creating," "generating," "using," "accessing," "executing," "obtaining," "storing," "transmitting," "providing," "establishing," "receiving," "identifying," "initiating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general-purpose computer system selectively programmed by a computer program stored in the computer system. Such a computer program may be stored in a computer-readable tangible storage medium.

The methods and illustrative examples described herein are not inherently related to any particular computer or other apparatus. Various general-purpose systems may be used in accordance with the teachings described herein, or it may prove convenient to construct more specialized apparatus to perform method 600 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   receiving, by a service manager of a first computing system, a first remote access command identifying a second computing system, a service on the second computing system, and an action to control the service;
   transmitting, by the service manager of the first computing system, a first action command derived from the first remote access command to a service manager of the second computing system, wherein the service manager of the second computing system comprises a background process that enables remote access by continuously monitoring for communications coming from other computing systems;
   responsive to performing an action with respect to a service on the first computing system, generating a second remote access command identifying the second computing system, a second service on the second computing system, and an action to be performed with respect to the second service on the second computing system, wherein the second service on the second computing system matches the service on the first computing system and the action performed with respect to the service on the first computing system matches the action to be performed with respect to the second service on the second computing system; and
   transmitting, by the service manager of the first computing system, a second action command derived from the second remote access command to the service manager of the second computing system.

2. The method of claim 1, wherein the first action command transmitted, by the service manager of the first computing system, to the service manager of the second computing system is executed by the service manager of the second computing system.

3. The method of claim 1, wherein the service manager of the first computing system and the background process of the second computing system each comprise a daemon process.

4. The method of claim 1, wherein the transmission of the first action command from the service manager of the first computing system to the service manager of the second computing system is encrypted.

5. The method of claim 1, wherein transmitting, by the service manager of the first computing system, the first action command comprises determining, by the service manager of the first computing system, whether remote access of the service manager of the second computing system is enabled.

6. The method of claim 1, wherein the second computing system is identified by one of: an internet protocol (IP) address, a unique identifier, or a group identifier.

7. The method of claim 1, wherein the action to control the service is one of: starting, stopping, enabling, or disabling the service.

8. The method of claim 1, wherein remote access to a service manager of the second computing system is performed via a command-line interface tool.

9. A system comprising:
   a memory device;
   a processing device, operatively coupled to the memory device, to perform operations comprising:
      receiving, by a service manager of a first computing system, a first remote access command identifying a second computing system, a service on the second computing system, and an action to control the service;
      transmitting, by the service manager of the first computing system, a first action command derived from the first remote access command to a service manager of the second computing system, wherein the service manager of the second computing system comprises a background process that enables remote access by continuously monitoring for communications coming from other computing systems;
      responsive to performing an action with respect to a service on the first computing system, generating a second remote access command identifying the second computing system, a second service on the second computing system, and an action to be performed with respect to the second service on the second computing system, wherein the second service on the second computing system matches the service on the first computing system and the action performed with respect to the service on the first computing system matches the action to be performed with respect to the second service on the second computing system; and transmitting, by the service manager of the first computing system, a second action command derived from the second remote access command to the service manager of the second computing system.

10. The system of claim 9, wherein the first action command transmitted, by the service manager of the first computing system, to the service manager of the second computing system is executed by the service manager of the second computing system.

11. The system of claim 9, wherein the service manager of the first computing system and the background process of the second computing system each comprise a daemon process.

12. The system of claim 9, wherein the transmission of the first action command from the service manager of the first computing system to the service manager of the second computing system is encrypted.

13. The system of claim 9, wherein transmitting, by the service manager of the first computing system, the first action command comprises determining, by the service manager of the first computing system, whether remote access of the service manager of the second computing system is enabled.

14. The system of claim 9, wherein the second computing system is identified by one of: an internet protocol (IP) address, a unique identifier, or a group identifier.

15. A non-transitory computer-readable storage medium including instructions that, when executed by a processing device, cause the processing device to perform a method comprising:
  receiving, by a service manager of a first computing system, an action command to control a service;
  determining that a second computing system is designated to mirror the first computing system, wherein the second computing system is enabled for remote access;
  forwarding, by the service manager of the first computing system, the action command to a service manager of the second computing system wherein the service manager of the second computing system comprises a background process that enables remote access by continuously monitoring for communications coming from other computing systems;
  receiving, by the service manager of the first computing system, a command requesting confirmation that the second computing system mirrors the first computing system, wherein the command is received from the service manager of the second computing system; and
  responsive to determining that the second computing system does not mirror the first computing system, transmitting, by the service manager of the first computing system, one or more action commands to the service manager of the second computing system that will cause the second computing system to mirror the first computing system.

16. The non-transitory computer-readable storage medium of claim 15, wherein the forwarding of the action command to the service manager of the second computing system is performed before or after the execution of the action command on the first computing system.

17. The non-transitory computer-readable storage medium of claim 15, wherein the command requesting confirmation that the second computing system mirrors the first computing system includes one of: a time stamp of the last service executed or a log of services executed by the second computing system.

* * * * *